(12) United States Patent
Quinton et al.

(10) Patent No.: US 12,252,999 B2
(45) Date of Patent: Mar. 18, 2025

(54) LUBRICATION OF BEARINGS OF A TURBOMACHINE SHAFT

(71) Applicant: SAFRAN POWER UNITS, Toulouse (FR)

(72) Inventors: Romain Quinton, Moissy-Cramayel (FR); Serge Marie Gabriel Cot, Moissy-Cramayel (FR); Jean-Paul Salvador Lopez, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 18/573,938

(22) PCT Filed: Jun. 28, 2022

(86) PCT No.: PCT/FR2022/051288
§ 371 (c)(1),
(2) Date: Dec. 22, 2023

(87) PCT Pub. No.: WO2023/275487
PCT Pub. Date: Jan. 5, 2023

(65) Prior Publication Data
US 2024/0209752 A1  Jun. 27, 2024

(30) Foreign Application Priority Data
Jul. 1, 2021  (FR) ........................................ 2107150

(51) Int. Cl.
*F02C 7/06* (2006.01)
*F01D 25/16* (2006.01)
(Continued)

(52) U.S. Cl.
CPC ............. *F01D 25/18* (2013.01); *F01D 25/16* (2013.01); *F05D 2240/50* (2013.01); *F05D 2260/98* (2013.01)

(58) Field of Classification Search
CPC ...... F01D 25/16; F01D 25/18; F05D 2240/00; F02C 7/06; F04D 29/06
See application file for complete search history.

(56) References Cited

U.S. PATENT DOCUMENTS 6,454,051 B1 * 9/2002 Okayasu ................... F16N 7/36
184/13.1
2005/0150873 A1 * 7/2005 Schmitt-Walter .... B23K 11/253
219/86.32

(Continued)

FOREIGN PATENT DOCUMENTS

| EP | 1662095 A2 | 5/2006 |
| FR | 3003300 A1 | 9/2014 |

(Continued)

OTHER PUBLICATIONS

International Patent Application No. PCT/FR2022/051288 International Search Report and Written Opinion dated Sep. 28, 2022 with English Translation, 12 pages.

*Primary Examiner* — Deming Wan
(74) *Attorney, Agent, or Firm* — Cozen O'Connor

(57) ABSTRACT

An assembly for a gas turbine includes a hollow central shaft which is guided in rotation by at least one bearing, the assembly further including a device for lubricating said at least one bearing, the device including a hollow lubricant delivery tube which is arranged fixedly in the central shaft and is configured to deliver lubricant to the at least one bearing, the lubricant delivery tube having a first section with a first diameter and a second section with a second diameter which is greater than the first diameter, the second section including a plurality of radial channels connecting (Continued)

the inside of the lubricant delivery tube and leading radially to the outside of the lubricant delivery tube towards a radially inner wall of the central shaft so as to form a lubricant film between said second section of the lubricant delivery tube and said radially inner wall of the central shaft.

13 Claims, 7 Drawing Sheets

(51) Int. Cl.
  *F01D 25/18* (2006.01)
  *F01D 25/26* (2006.01)

(56) References Cited

U.S. PATENT DOCUMENTS

| 2013/0213740 | A1 | 8/2013 | Tanaka et al. |
| 2014/0271151 | A1 | 9/2014 | Belmonte et al. |

FOREIGN PATENT DOCUMENTS

| FR | 3031786 A1 | 7/2016 |
| WO | WO 2012168649 A1 | 12/2012 |

* cited by examiner

LUBRICATION OF BEARINGS OF A TURBOMACHINE SHAFT

CROSS-REFERENCE TO RELATED APPLICATIONS

This application is a US National Phase application of PCT/FR2022/051288, filed Jun. 28, 2022, which claims priority to French Patent Application No. 2107150, filed Jul. 1, 2021, both of which are hereby incorporated in their entireties.

TECHNICAL FIELD OF THE INVENTION

This presentation concerns the lubrication of rotating parts in gas turbines, in particular the lubrication of bearings supporting a gas turbine shaft.

BACKGROUND

An example of a gas turbine is shown in FIG. 1, in which the upstream (AM) and downstream (AV) of the structure along a motor axis, i.e. the longitudinal axis hereinafter, are respectively located to the left and right in FIG. 1. Gas turbine 10 comprises, axially in the upstream part, an axial compressor 12 followed by a radial compressor 14. An annular row of stator blades 16 is arranged between axial compressor 12 and radial compressor 14, for straightening an air flow leaving axial compressor 12. Gas turbine 10 further comprises a combustion chamber 18 which is cooled by air flow 20 leaving radial compressor 14 and which is diffused around combustion chamber 18 by diffuser 22. The hot gases leaving combustion chamber 18 in turn drive a high-pressure turbine 24 carried by a drive shaft 35. High-pressure turbine 24 is connected by drive shaft 35 to the axial and radial compressors and drives their rotation. The hot gases leaving combustion chamber 18 also drive the rotation of a free turbine 26 that is separate from high-pressure turbine 24. Free turbine 26 comprises several stages of annular rows of moving blades driving the rotation of a turbine shaft 27 which is connected by a reduction gearbox 30 to an output shaft 28. Output shaft 28 is rotated by turbine shaft 27 and can for example be connected to a rotor of a helicopter equipped with gas turbine 10. Output shaft 28 is offset relative to the hot parts of the gas turbine, namely the combustion chamber and turbines 24 and 28. Gas turbine 10 also comprises another annular row of stator blades 32 arranged downstream of free turbine 26 and configured to straighten the air flow leaving high-pressure turbine 24. The hot gases exiting free turbine 26 are expelled via a nozzle 34 arranged at the downstream end of gas turbine 10.

Drive shaft 35 is guided in rotation by an upstream bearing 36 and a downstream bearing 38. These bearings ensure that the shaft is maintained in the radial and longitudinal position while ensuring its rotation.

Bearings 36 and 38 are located respectively near combustion chamber 18 and turbine 24 in which hot gases circulate. Bearings 36 and 38 are thus subjected to high temperatures and require effective lubrication for greasing the rolling elements of the bearings and for releasing heat. The lubricating oil therefore passes through a high-temperature area to reach bearings 36 and 38, which can raise issues of thermal protection and the associated space requirements, and can also pose the risk of oil coking. In addition, access to bearings 36 and 38 is difficult due to the occupied space around drive shaft 35.

FIG. 10 illustrates another example in which the lubricant delivery is subjected to high temperatures. FIG. 10 represents an auxiliary power unit (APU) 400, comprising a turbine shaft 402 common to a turbine 414 and a compressor 410 and guided in rotation by bearings 404 and 406. APU 400 comprises an air intake 408 leading to compressor 410. The compressed air leaving the compressor is directed towards a combustion chamber 412 which outputs hot gases. These drive turbine shaft 402 through turbine 414.

Bearing 406 is surrounded by the outlet for the hot gases and by the bottom of combustion chamber 412.

The lubricating oil for bearings 404 and 406 is conveyed from an area located radially outside the heat sources, for example by traveling through an arm connecting the outer body, or outside casing, of the turbine to the elements which hold the outside rings of the rolling elements in place. The lubricating oil therefore passes through high-temperature areas to reach bearings 404 and 406, which can cause problems in its effectiveness in cooling the rings and in the space required near the shaft. In addition, lubrication transport increases the occupied space outside the outer body of the turbine. The lubricant reserves are generally positioned upstream of the machine in the cold air intake area of compressor 410.

There are bearing lubrication systems which are arranged to deliver lubricant to the outer rings of the bearings through pumps and nozzles arranged at the bearings or connected to the bearings by lubricant transfer means. However, these systems lack efficiency and are complex to integrate into gas turbines. Indeed, it is known that the supplying of lubricant is more effective when it is implemented by the rotating inside ring of the bearing. Migration of the lubricant from the inside ring to the outside ring through the rolling elements is ensured by centrifugal forces.

Document FR3003300A1 is known, which describes a system for lubricating a bearing between counter-rotating external and internal shafts. The lubricant is transported from the outer wall of the external shaft, by a centripetal scraper which goes against the centrifugal forces, towards its inner wall and a short worm screw, integral with the internal shaft, which pushes the lubricant towards the bearing area where a sloped shape takes advantage of centrifugal forces to complete the lubrication migration to the bearing to be lubricated. Such a system is complex to implement and requires rotational guidance of both the internal shaft and external shaft.

Document US20130213740 is also known, which concerns the lubrication of a transmission and discloses a tube arranged in a rotating hollow shaft in order to inject oil into said hollow shaft, the shaft comprising radial holes forming pipes for delivering the oil by centrifugation towards elements to be lubricated outside the shaft. The end of the tube comprises an axial hole for projecting oil towards the bottom of the rotating shaft. The tube is arranged in a cantilevered manner in the hollow shaft, and remains centered inside the shaft in particular due to an annular seal inserted radially between the tube and the inside wall of the hollow shaft. This device does not seem suitable for the case of a hollow shaft which rotates at very high speeds, for example such as a shaft of a gas turbine of a turbomachine, because the annular seal would suffer significant wear and would have to be replaced frequently. In addition, the worn material would contaminate the lubricant.

There is therefore a need for a lubrication of bearings supporting a gas turbine shaft that is more efficient and more reliable.

SUMMARY OF THE INVENTION

For this purpose, the present description proposes an assembly for a gas turbine comprising a hollow central shaft which is guided in rotation by at least one bearing, the assembly further comprising a device for lubricating said at least one bearing comprising a hollow lubricant delivery tube arranged in the hollow central shaft and configured to convey the lubricant to said at least one bearing, the delivery tube having a first section with a first diameter and a second section with a second diameter that is greater than the first diameter, the second section comprising a plurality of radial channels connecting the inside of the lubricant delivery tube and leading radially to the outside of the lubricant delivery tube towards a radially inner wall of the hollow central shaft so as to form a lubricant film between said second section of the lubricant delivery tube and said radially inner wall of the hollow central shaft.

The lubricant film thus allows maintaining the lubricant delivery tube in a constant radial position. This makes it possible to simplify mounting the lubricant delivery tube while conveying the lubricant on the internal side of said at least one bearing. The assembly therefore allows better lubrication of the at least one bearing. The lubricant delivery tube can be supplied with lubricant at its upstream end and can include an opening at its downstream end which allows delivering the lubricant as close as possible to said at least one bearing. The gas turbine may comprise a compressor followed by a combustion chamber which produces hot gases. These hot gases can drive a turbine which is configured to drive the rotation of the central shaft.

In this description, the radial direction is a direction perpendicular to an axis of rotation of the hollow shaft, and an axial or longitudinal direction is a direction parallel to the axis of rotation, and a radial direction is a direction perpendicular to the axis of rotation.

The central hollow shaft can drive the rotation of or support the rotating parts of the gas turbine.

The first diameter and the second diameter can be the outside diameters of the first section and second section respectively.

The lubricant can preferably be introduced under pressure into the lubricant delivery tube.

The second diameter can be between 90% and 99% of the diameter of the radially inner wall of the hollow central shaft. Thus, a relatively thin space can be formed between the radially outer surface of the second part and the radially inner wall of the hollow central shaft. A lubricant film can be formed in the relatively thin space between the outer surface of the second section and the inner wall of the hollow central shaft.

The lubricant film thus makes it possible to maintain the lubricant delivery tube in a constant radial position without direct contact with the hollow central shaft. This allows simplifying the mounting of the lubricant delivery tube which is then automatically centered in the hollow central shaft.

The radially inner wall of the hollow shaft can be the surface of the radially inner wall defining the hollow of the central shaft.

The hollow central shaft can include sections having an inside diameter that is greater than the diameter of the sections which allow creating the lubricant film with the second section of the lubricant delivery tube.

The second section can comprise at least one thread of a threaded portion. This threaded portion can be formed by a spiral thread. The outside diameter of the thread can then be the diameter of the second section of the lubrication delivery tube. Thus, the central shaft being driven to rotate in particular when a relative rotational movement exists between the hollow central shaft and the lubricant delivery tube, the lubricant ejected by the radial channels and located in the annular space between the threaded portion and the radially inner wall of the hollow central shaft is pushed by the threads of the threaded portion towards a downstream portion of the lubricant delivery tube and in particular of the central shaft. This improves the lubrication of the at least one bearing and allows centering the lubricant delivery tube in the central shaft. The upstream side of the lubricant delivery tube is towards the lubricant intake side of the lubricant delivery tube. In particular, this makes it possible to force the lubricant towards the downstream portion where the at least one bearing is located.

The lubricant delivery tube can comprise a single threaded portion, and a longitudinal dimension of said threaded portion can be less than a longitudinal dimension of the central shaft. The second diameter can be the outside diameter of the threads of the threaded portion.

The lubricant delivery tube can comprise a single threaded portion, and a longitudinal dimension of said threaded portion can be less than a longitudinal dimension of the central shaft.

The second section of the lubricant delivery tube can be formed by threads of two threaded portions separated along the axis of rotation by a non-threaded portion. A first threaded portion of said threaded portions can be arranged towards the upstream side of the lubricant delivery tube and a second threaded portion of said threaded portions can be arranged towards the downstream side of the lubricant delivery tube.

A radially outer surface of each thread of at least one threaded portion can comprise a first cylindrical surface and a second surface, in particular annular, that is inclined relative to an axis of rotation of the central shaft. The second surface can be inclined so as to converge towards the axis of rotation of the central shaft.

The radially outer surface of each thread can be arranged facing the radially inner wall of the central shaft. The second surface can be conical.

The first cylindrical surface can have a radially outside diameter that is more or less equal to the diameter of the radially inner wall of the hollow shaft. The inclined second surface can have the second diameter.

The second diameter can thus be variable, for example decreasing from upstream to downstream along the direction of lubricant circulation.

At least one of the radial channels can lead to an inclined second surface of the at least one threaded portion of the lubricant delivery tube, so as to create a hydrodynamic wedge effect and autocentering effect for the lubricant delivery tube.

At least one of the radial channels can lead to a cylindrical surface of the lubricant delivery tube arranged facing the inner wall of the central shaft.

The first cylindrical surface can be arranged upstream of the inclined second surface along the direction of lubricant circulation.

A longitudinal dimension of the lubricant delivery tube can be less than a longitudinal dimension of the central shaft. The lubricant can thus be conveyed to an intermediate longitudinal position of the central shaft.

The lubricant delivery tube can be arranged to be fixed in rotation and in longitudinal translation relative to the gas turbine, in particular relative to the central shaft.

The assembly can comprise means for fixing the lubricant delivery tube in longitudinal translation and in rotation around the axis of rotation.

Thus, the second diameter which can be composed of a portion which is cylindrical then conical from upstream to downstream makes it possible to create a hydrodynamic wedge effect with the lubricant, and the relative movement of the hollow shaft rotating in relation to the lubricant delivery tube, which is fixed, allows reinforcing the auto-centering of the delivery tube.

At least one of the radial channels can open onto a cylindrical surface of the lubricant delivery tube arranged facing the radially inner wall of the central shaft.

The cylindrical surface of the lubricant delivery tube can be coaxial with the radially inner wall of the central shaft. The radially inner wall of the central shaft can also be cylindrical.

The radial channels can be distributed circumferentially around the axis of rotation and distributed longitudinally along the second section.

The central shaft can comprise at least one chamber for distributing lubricant to the at least one bearing.

The lubricant delivery tube can comprise a longitudinal channel which leads into said at least one lubricant distribution chamber.

The longitudinal channel can lead to a longitudinal end of the lubricant delivery tube located at a lubricant distribution chamber.

The longitudinal channel can be fluidly connected to a lubricant distribution chamber via one of the radial channels.

The central shaft can comprise two lubricant distribution chambers. One distribution chamber can be arranged between the first threaded portion and the second threaded portion.

Each distribution chamber can have an inside diameter that is greater than the inside diameter of the radially inner wall of the central shaft.

Each distribution chamber can comprise lubricant distribution ports distributed circumferentially around the longitudinal axis and open to the at least one bearing. The lubricant distribution ports allow lubricant to be directed towards the at least one bearing from inside the distribution chamber.

The central shaft can comprise a particle removal chamber, for example for particles resulting from wear of the bearing and lubricant delivery tube, in particular from the inside of the central shaft towards the outside of said shaft. The particle removal chamber can have an inside diameter that is greater than the inside diameter of the radially inner wall of the central shaft. Said particles can come for example from the recirculation of particles from wear of the bearing and lubricant delivery tube.

The particle removal chamber can be arranged at a downstream part of the delivery tube and upstream of the lubricant distribution chamber.

The particle removal chamber can be arranged between the first threaded portion and the second threaded portion.

The at least one bearing can comprise an inner ring mounted around the central shaft which comprises a plurality of holes leading to at least one ball, or the rolling element, carried by the inner ring. These holes can be distributed circumferentially around the longitudinal axis. The inner ring of the at least one bearing can comprise two circumferential rows of holes spaced apart longitudinally. The circumferential rows of holes can be offset circumferentially, in particular angularly around the axis, relative to each other. In other words, viewed along the longitudinal axis, each hole in one of the annular rows of distribution holes can be arranged circumferentially between two holes of the other annular row of distribution holes. This allows good distribution of lubricant in the bearing.

At least one of the holes of the bearing can be longitudinally oriented from a downstream portion or an upstream portion of the inner ring towards a center of rotation of the balls, or rolling elements, of the bearing. The lubricant is thus aimed directly towards the balls or rolling elements, which improves lubrication.

The lubricant can be oil for example, or fuel. The lubrication device can comprise means for cooling the lubricant, for example a heat exchanger.

The lubricant delivery tube can be made of bronze to reduce friction during transient phases where lubrication is less present, for example when starting/stopping the rotation of the central shaft.

The particle removal chamber can be configured to expel some or all of the lubricant film comprised within the annular space between the second section and the radially inner wall of the central shaft.

The assembly can comprise a seal arranged in an annular space formed between a radially outer wall of the delivery tube and the radially inner wall of the central shaft. The seal can be arranged at an upstream portion of the lubricant delivery tube and can be configured to prevent the flow of lubricant upstream in the lubricant delivery tube or towards the lubricant inlet.

The second section of the lubricant delivery tube can comprise a first thread and a second thread which are parallel. The first thread can extend over some or all of the threaded portion. The second thread can extend over some or all of the threaded portion. The threaded portion can comprise the two threads in particular when the pitch of the first thread is greater than 45°, so as to have the two threads loaded by opposing hydrodynamic forces to avoid local bending of the lubricant delivery tube.

According to one embodiment, the lubricant delivery tube can be arranged inside the hollow central shaft in a cantilevered manner.

The present description also concerns a gas turbine comprising an assembly as mentioned above.

DETAILED DESCRIPTION OF THE INVENTION

Figure 1:
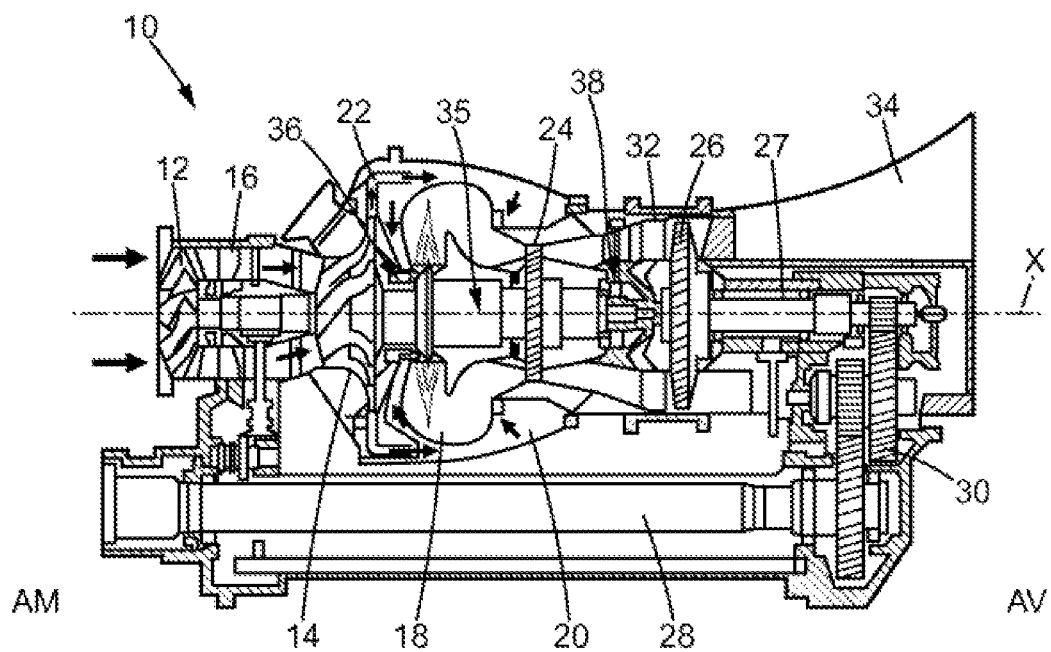
FIG. 1, already described, represents a schematic profile section view of a gas turbine for an aircraft.
Figure 2:
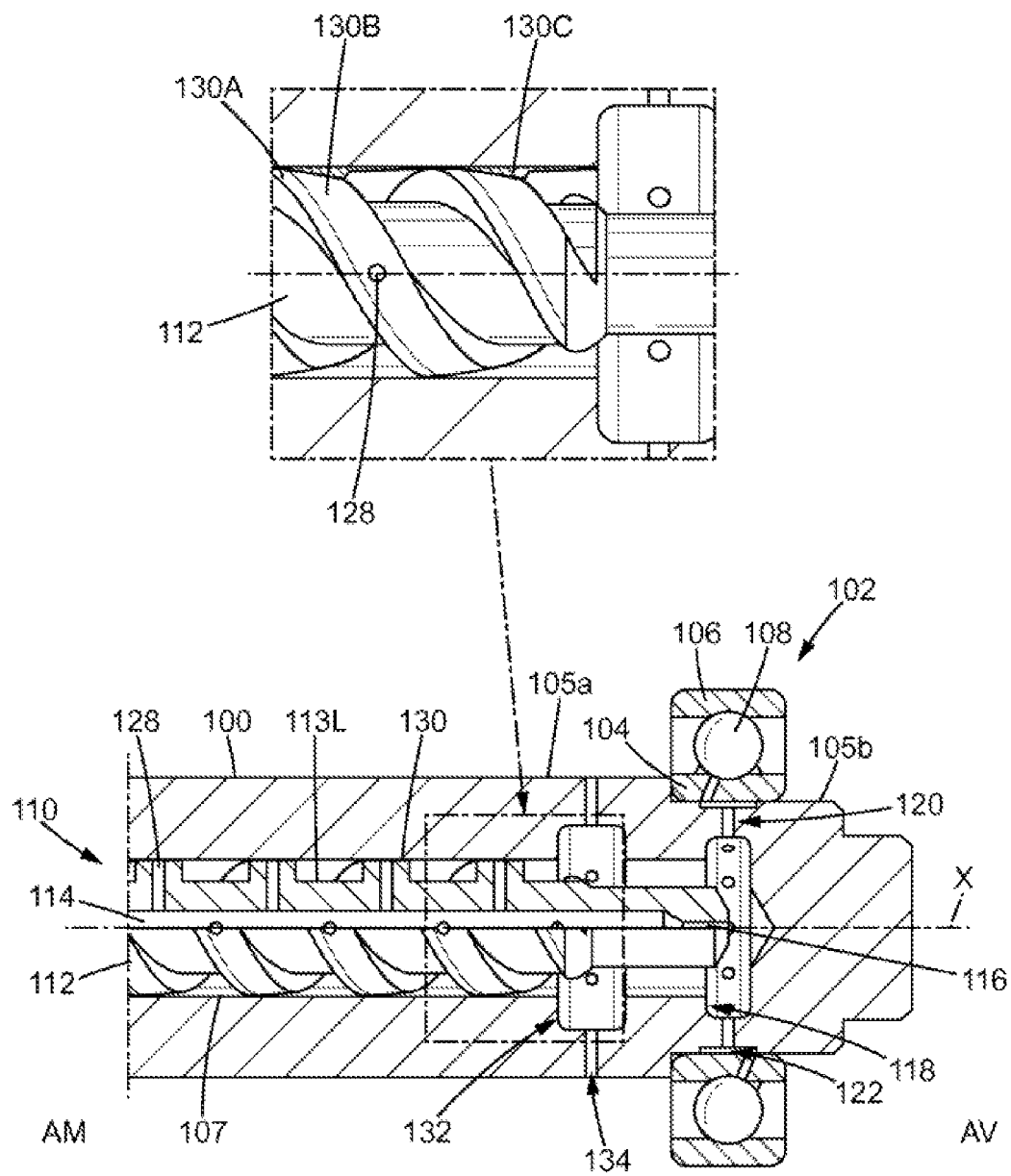
FIG. 2 represents a schematic profile section view of a central shaft of a gas turbine equipped with a first example of a lubrication device.
Figure 3:
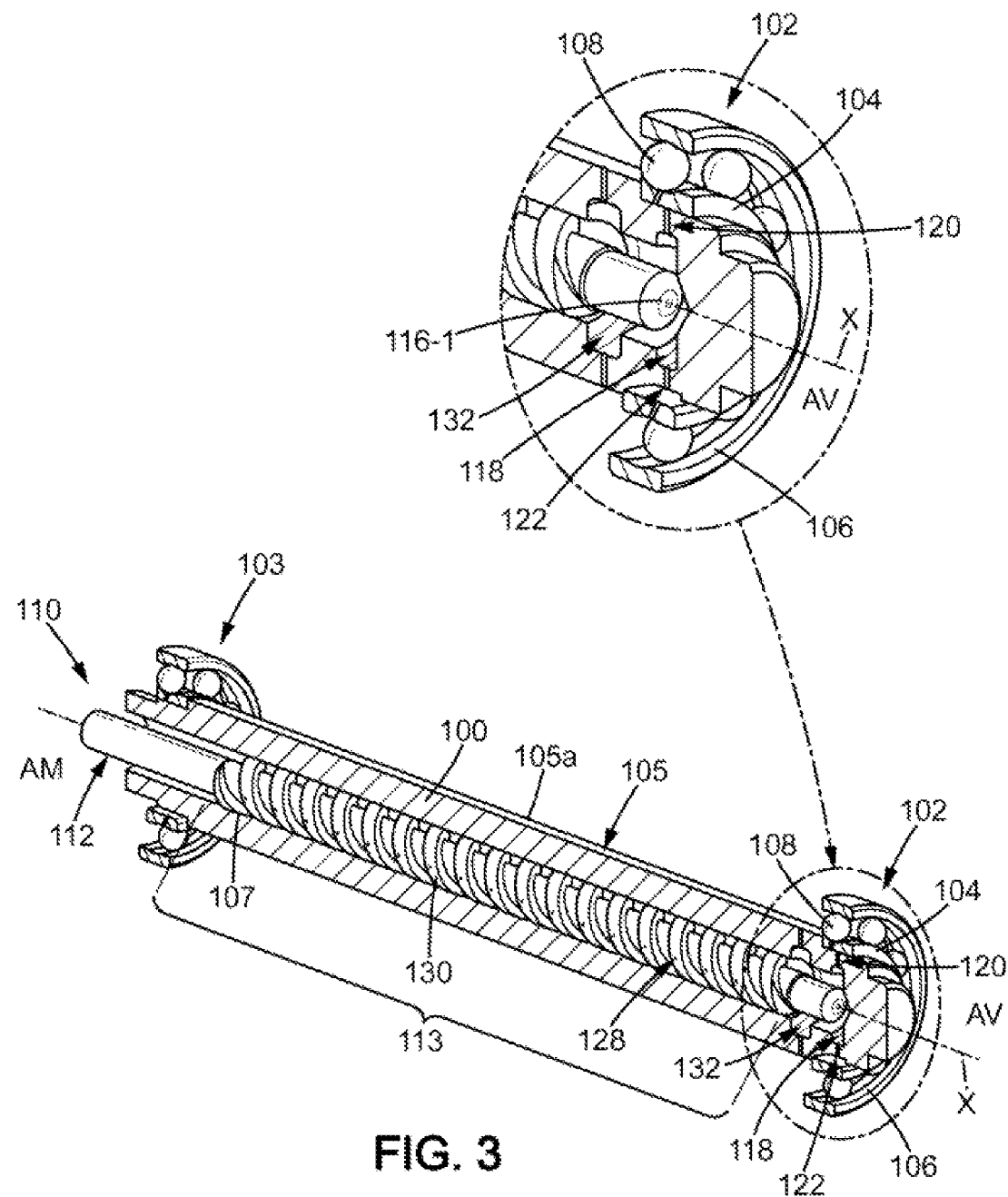
FIG. 3 represents a schematic perspective section view of the shaft of FIG. 2.
Figure 4:
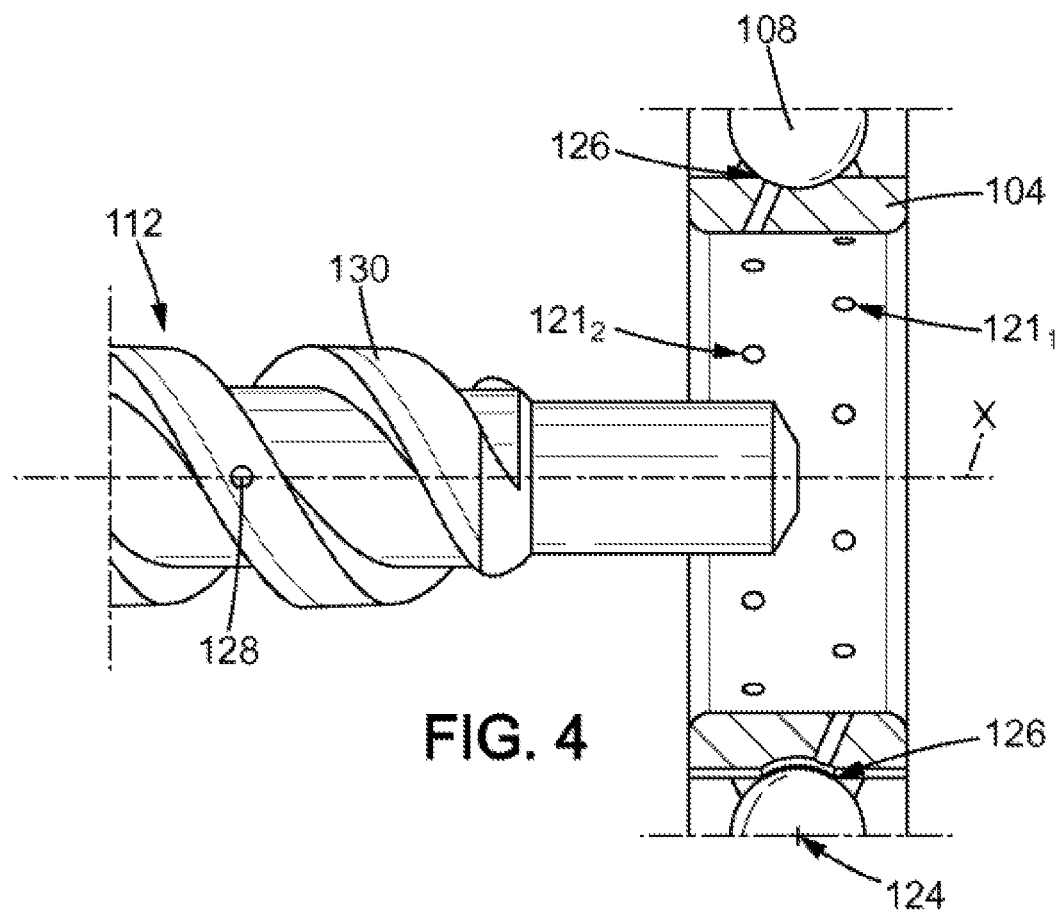
FIG. 4 represents a profile view of one end of the lubrication device.

FIGS. 2 to 4 represent a central shaft 100 rotating around a longitudinal axis X, intended for a turbomachine. Central shaft 100 is hollow and therefore has a radially inner wall 107.

Central shaft 100 is guided in rotation by a bearing 102 arranged in a downstream portion of central shaft 100. Of course, other bearings, such as bearing 103, may be provided to guide the rotation of central shaft 100 and can be arranged in the upstream portion of central shaft 100 or along said shaft. In addition, other bearings may also be arranged in the downstream portion of central shaft 100.

Bearing 102 comprises an inner ring 104 mounted around a radially outer wall 105 of central shaft 100 and an outer ring 106 capable of being mounted in a casing of the gas turbine. Bearing 102 also comprises balls 108 arranged between inner ring 104 and outer ring 106 and which are distributed circumferentially around longitudinal axis X. Bearing 102 may comprise cylindrical or conical rolling elements instead of balls 108. Wall 105 comprises a main section 105a and an end section 105b. Inner ring 104 is mounted around end section 105b.

To ensure lubrication of bearing 102, central shaft 100 is equipped with a lubrication device 110 which comprises a tube 112 arranged inside central shaft 100. Tube 112 has a radially outer wall carrying a spiral thread on a threaded portion 113 of its length. The thread preferably can extend over substantially the entire length of tube 112, or over part of the length of tube 112.

Furthermore, tube 112 is hollow and comprises an internal channel 114 extending for the entire length of tube 112 in order to convey lubricant from the upstream AM portion of tube 112 to bearing 102. Internal channel 114 has a narrowing 116 at the downstream end of tube 112, ending in a nozzle 116 which discharges the lubricant into a distribution chamber 118 of central shaft 100. Internal channel 114 may lead directly to the downstream end of tube 112 with no narrowing.

The lubricant can be oil-based. The lubricant is preferably introduced under pressure into internal channel 114.

The lubricant allows the rolling elements of bearing 102 to be lubricated and the heat accumulated during rotation of bearing 102 to be discharged.

Distribution chamber 118 is formed inside central shaft 100 and has an inside diameter that is greater than the inside diameter of radially inner wall 107 of central shaft 100. Distribution chamber 118 comprises a plurality of distribution ports 120 distributed circumferentially around longitudinal axis X and which lead to end section 105b of radially outer wall 105 of central shaft 100. In particular, distribution ports 120 lead into a groove 122 formed in end section 105b.

Groove 122 forms an annular space between the surface of end section 105b and the inner ring 104, in which the lubricant can accumulate. The lubricant discharged into distribution chamber 118 by tube 112 is conveyed through distribution ports 120 into groove 122 by centrifugal force when central shaft 100 is rotating about longitudinal axis X. Centrifugal force also allows the lubricant to be conveyed to outer ring 106.

To direct the lubricant towards balls 108, inner ring 104 has two annular rows of distribution ports $121_1$ and $121_2$ spaced apart longitudinally and in which the distribution ports are distributed circumferentially around longitudinal axis X. As shown in FIG. 3, the ports of annular row of distribution ports $121_1$ are offset circumferentially, in particular angularly along the axis of the central shaft relative to the ports of annular row of distribution ports $121_2$. To express this differently, when viewed along the longitudinal axis X, each port of one of the annular rows of distribution ports $121_1$ and $121_2$ is arranged circumferentially between two ports of the other annular row of distribution ports $121_1$ and $121_2$. For example, each port of one of the annular rows of distribution ports $121_1$ and $121_2$ is arranged circumferentially in the middle between the two ports of the other annular row of distribution ports $121_1$ and $121_2$. This allows good lubricant distribution in bearing 102.

Annular row of distribution ports $121_1$ arranged in the downstream portion has distribution ports oriented longitudinally from downstream to upstream, in particular towards a center of rotation 124 of balls 108. Thus, the distribution ports of the downstream annular row of distribution ports $121_1$ lead to a central portion 126 of the inside of inner ring 104.

Symmetrically, annular row of distribution ports $121_2$ arranged in the upstream portion has distribution ports oriented longitudinally from upstream to downstream, in particular towards the center of rotation 124 of balls 108. Thus, the distribution ports of the upstream annular row of distribution ports $121_2$ lead to the central portion 126 of the inside of inner ring 104. Alternatively, inner ring 104 may comprise a single annular row of distribution ports or more than two annular rows of distribution ports which are spaced apart longitudinally.

Tube 112 is held fixed in rotation and in longitudinal translation relative to central shaft 100 by dedicated means arranged in the upstream portion of tube 112.

As tube 112 is arranged in a cantilevered manner inside shaft 100, there is a chance of it undergoing deformation and wear due to friction during rotation of central shaft 100. To avoid damaging tube 112, radial channels 128 traverse the thickness of tube 112 from internal channel 114, leading to a thread crest 130 of threaded portion 113 of tube 112.

Thus, the lubricant conveyed under pressure in internal channel 114 is ejected radially through radial channels 128 towards radially inner wall 107 of central shaft 100 and forms a lubricant film between radially outer wall 130 of tube 112 and radially inner wall 107 of central shaft 100, in particular within space 130C. This lubricant film makes it possible to maintain tube 112 in a constant radial position and avoids contact between tube 112 and shaft 100. Threaded portion 113 of tube 112 also makes it possible to direct the lubricant towards particle removal chamber 132 when central shaft 100 is rotating. Threaded portion 113 of tube 112 thus forms a worm screw. Threaded portion 113 of tube 112 makes it possible to prevent reflux of the lubricant towards the upstream of tube 112. It is internal channel 114 and nozzle 116 of tube 112 which convey clean lubricant towards distribution chamber 118 in order to supply the downstream bearing.

In particular, each thread crest 130 has a first radially outer surface 130A which is cylindrical. Each thread crest 130 also has a radially outer second surface 130B arranged downstream of first surface 130A in the direction of circulation of the fluid, which is inclined relative to longitudinal axis X. Radial channels 128 lead to second inclined surface 130B.

First surface 130A is coaxial with radially inner wall 107 of central shaft 100. First surface 130A maintains the presence of a lubricant film with radially inner wall 107 of central shaft 100. In other words, a lubricant film is held in a radial space between first surface 130A and radially inner wall 107 of central shaft 100.

Thus the profile of threads 130 provides dynamic lift due to the lubricant film during relative movement between lubricant delivery tube 112 and central shaft 100. The delivery of lubricant at second inclined surface 130B generates a hydrodynamic wedge effect which greatly contributes to the lift. The hydrodynamic lift produced under the oil-wedge effect is obtained by creating flow via the shearing action of the oil film between two non-parallel surfaces, which is achieved here because second surface 130B is inclined relative to radially inner wall 107. As for first surface 130A, it allows having a dedicated wear surface in the event of contact in order to avoid wear of second surface 130B. The possibility of such contact can occur during startup, but once the turbine is operating, the presence of the lubricant film helps prevent contact. This wear surface formed by first surface 130A, which is parallel to radially inner wall 107 of central shaft 100, makes it possible to limit wear considerably at startup in comparison to a configuration where contact only occurs against a sharp angle of second surface 130B.

The hydrodynamic lift created by the oil-wedge effect allows lubricant delivery tube 112 to center itself regardless of the pressure at which the lubricant is injected into delivery tube 112.

Radial channels 128 are distributed circumferentially and longitudinally around longitudinal axis X. Radial channels 128 can advantageously be spaced apart circumferentially and longitudinally in a uniform manner along tube 112.

Central shaft 100 further comprises a particle removal chamber 132 formed inside said shaft and having an inside diameter greater than the inside diameter of radially inner wall 107 of central shaft 100. Thus, the particles formed by the aging of the lubricant and in particular resulting from various wearing contacts and carried by the lubricant, flow into particle removal chamber 132.

Particle removal chamber 132 comprises a plurality of distribution ports 134 distributed circumferentially around longitudinal axis X and which lead to end section 105*b* of radially outer wall 105 of central shaft 100. Particles due to wear of the lubricant are therefore expelled before they arrive at distribution chamber 118 and therefore do not reach bearing 102, which avoids any contamination of bearing 102.

For example, the inside diameter of particle removal chamber 132 can be greater than the inside diameter of distribution chamber 118. A longitudinal dimension of particle removal chamber 132 can be greater than the longitudinal dimension of distribution chamber 118. Particle removal chamber 132 can be configured to expel some or all of the lubricant film comprised in the annular space between threaded portion 113 and radially inner wall 107 of central shaft 100.

Lubrication device 110 can comprise include other particle removal chambers, similar to particle removal chamber 132 and arranged along central shaft 100.

Lubrication device 110 can comprise means for cooling the lubricant, for example a heat exchanger.

Tube 112 can be made of bronze to reduce friction during transient phases where lubrication is less present, for example when starting/stopping the rotation of central shaft 100.

Tube 112 can comprise an additional thread, in particular parallel to the first spiral thread, when the pitch of the thread of threaded portion 113 is greater than 45°. This makes it possible to balance the hydrodynamic force of a thread capable of bending tube 112 and in particular to have the two threads loaded by hydrodynamic forces diametrically opposite to each other so as to avoid locally bending lubricant delivery tube 112. In other words, the two threads advance by an offset of 180° relative to each other, which produces diametrically opposite hydrodynamic forces which compensate for each other.

Clearances 130*c* between radially outer wall of tube 112, in particular surface 130 of the threads of tube 112, and radially inner wall 107 of central shaft 100, are chosen so as to have stable centering of the screw and to avoid heating the lubricant before it reaches bearing 102.

Figure 5:
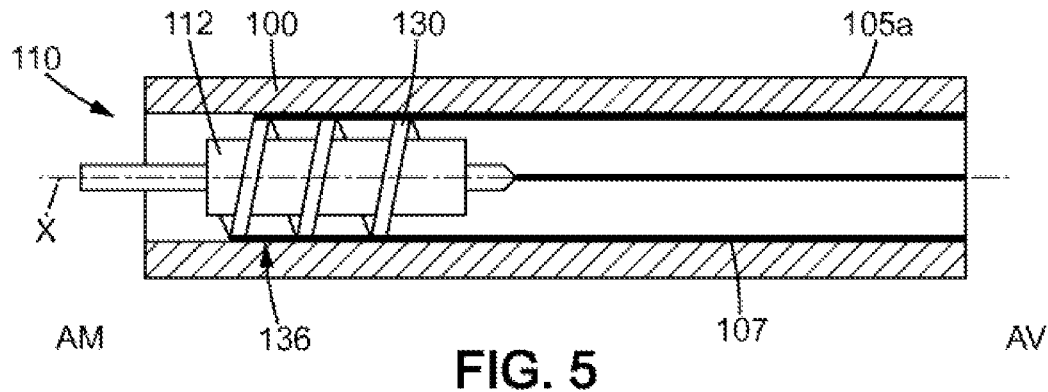
FIG. 5 represents a schematic profile section view of a central shaft of a gas turbine equipped with a second example of a lubrication device.

In the variant of tube 112 shown in FIG. 5, the longitudinal dimension of tube 112 is less than the longitudinal dimension of central shaft 100, in particular of the inside portion of the central shaft. The mouth of internal channel 114 is thus at an intermediate longitudinal position of central shaft 100. Threaded portion 113 carrying the outside thread of tube 112 pushes the lubricant 136 towards the downstream portion of central shaft 100 in the direction of bearing 102 to be lubricated.

Figure 6:
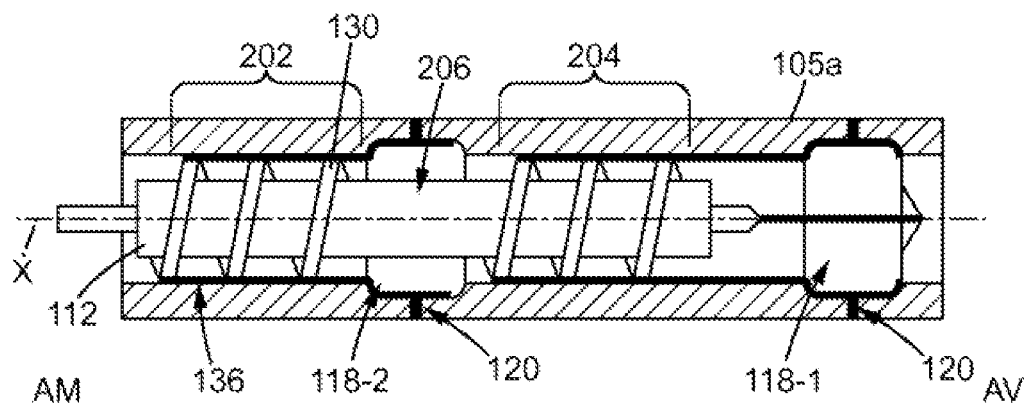
FIG. 6 represents a schematic profile section view of a central shaft of a gas turbine equipped with a third example of a lubrication device.

In the variant shown in FIG. 6, tube 112 has a first threaded portion 202 and a second threaded portion 204 which is separated longitudinally from first threaded portion 202 by an unthreaded portion 206 of tube 112. The threads of first threaded portion 202 and second threaded portion 204 can be identical, meaning that the outside diameters of the threads, the pitches of the threads, etc. are the same. Central shaft 100 comprises two lubricant distribution chambers 118-1 and 118-2. It is thus possible to lubricate two separate bearings on which the shaft is mounted and which are arranged radially facing distribution ports 120. Intermediate lubricant distribution chamber 118-2 can be supplied with lubricant, either by the lubricant coming from radial holes 128 pierced in first threaded portion 202 and which is pushed downstream to intermediate chamber 118-2, or by at least one pipe for example formed by a radial hole pierced in tube 112 to the right of the intermediate chamber. It can thus be arranged to have a particle removal chamber in central shaft 100 between first threaded portion 202 and intermediate chamber 118-2, to allow delivering clean lubricant into intermediate chamber 118-2.

Lubricant distribution chamber 118-2 is arranged longitudinally between first threaded portion 202 and second threaded portion 204.

Distribution chamber 118-1 receives lubricant coming from radial holes 128 pierced in second threaded portion 204 and pushed downstream, as well as clean lubricant coming from central channel 114 and nozzle 116 of tube 112.

Of course, tube 112 can comprise more than two threaded portions successively separated by non-threaded portions. For example, central shaft 100 can comprise a particle removal chamber arranged between two successive threaded portions.

Figure 7:
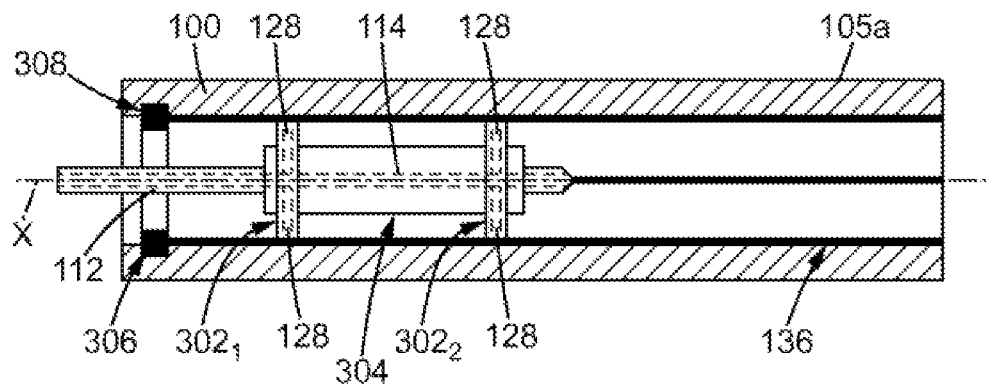
FIG. 7 represents a schematic profile section view of a central shaft of a gas turbine equipped with a fourth example of a lubrication device.

In the exemplary embodiment shown in FIG. 7, tube 112 does not have a threaded portion 113 but comprises a first section 304 surrounded by a second section 302 having a diameter greater than the diameter of first section 304. Second section 302 comprises a first portion $302_1$ and a second portion $302_2$ which are separated longitudinally by first section 304. Each of first portion $302_1$ and second portion $302_2$ comprises radial channels 128 which lead to an annular space between second section 302 and the radially inner wall of central shaft 100. Each of first portion $302_1$ and second portion $302_2$ has a cylindrical radially outer wall that is coaxial with radially inner wall 107 of central shaft 100.

The lubricant admitted into internal channel 114 is thus ejected through radial channels 128 towards radially inner wall 107 of central shaft 100 and forms a lubricant film 136 which allows centering tube 112 in central shaft 100.

The distribution chamber, not shown in FIG. 7, can be arranged downstream of the downstream end of tube 112, and the particle removal chamber can be arranged longitudinally upstream of the distribution chamber.

First portion $302_1$ and second portion $302_2$ can have identical longitudinal dimensions. Radial channels 128 can form an annular row, in particular can be distributed circumferentially, around the radially outer wall of each of first portion $302_1$ and second portion $302_2$.

To prevent lubricant 136 from leaking upstream, a seal 306 is arranged in an upstream portion of central shaft 100, for example upstream of first portion $302_1$. Seal 306 is arranged in the annular space between tube 112 and radially inner wall 107 of central shaft 100. Seal 306 is arranged in a groove 308 provided in radially inner wall 107 of central shaft 100. Seal 306 may be a dynamic lip seal.

Second section 302 may comprise other parts similar to first and second portions 302 carrying radial channels 128 and separated longitudinally by part of first section 304.

Figure 8:
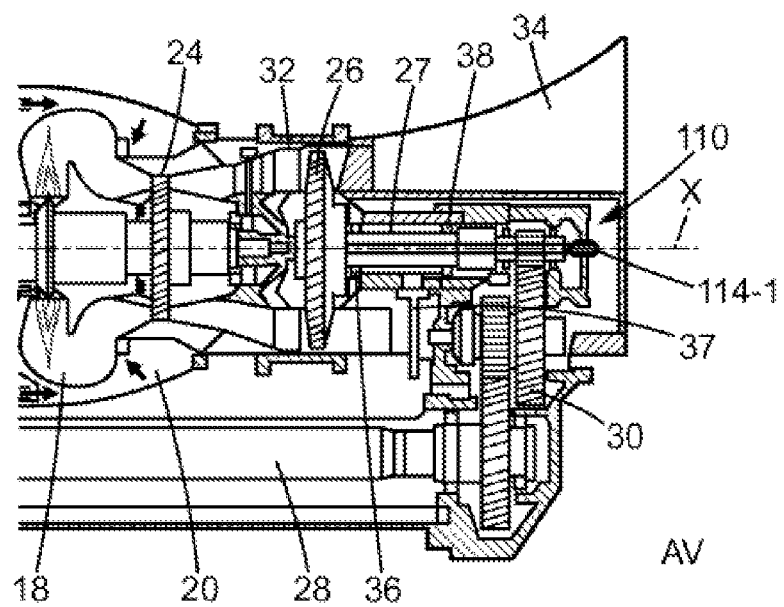
FIG. 8 represents part of the gas turbine of FIG. 1, equipped with an example of the lubrication device.

Lubrication device 110 can, for example, equip turbine shaft 27 of free turbine 26, as shown in FIG. 8, to enable lubrication of an upstream bearing 36 and/or a downstream bearing 38 of shaft 27. The lubricant can be introduced through inlet 114-1 of internal channel 114. Lubrication device 110 therefore does not need to travel through very hot parts of turbomachine 10, in particular such as the exhaust gas area, and thus makes it possible to avoid an excessive temperature of the lubricant while reducing the space occupied by the lubrication system.

Figure 9:
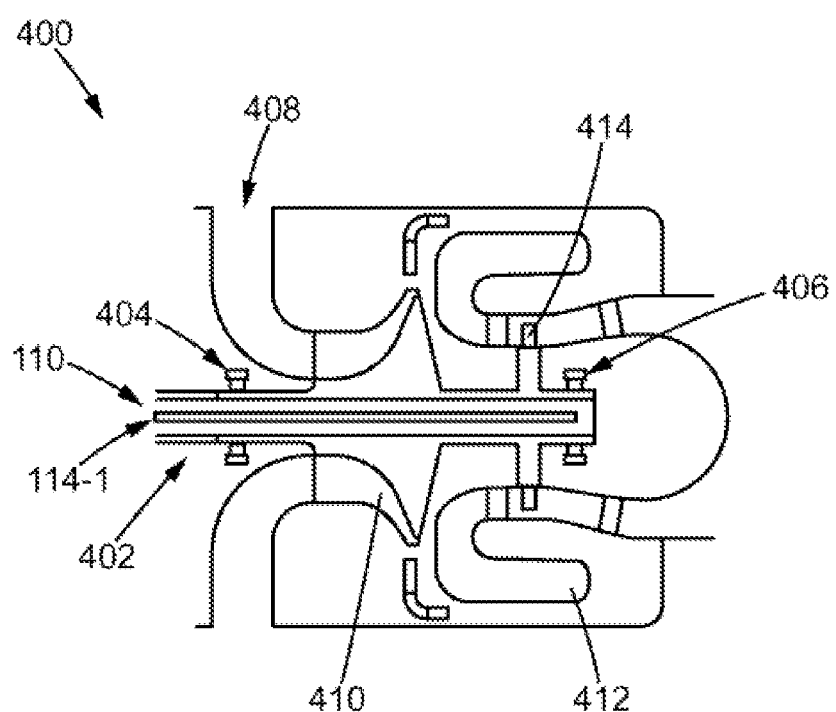
FIG. 9 represents an auxiliary power unit comprising an example of the lubrication device, FIG. 10, already described, represents an auxiliary power unit according to the prior art.
Figure 10:
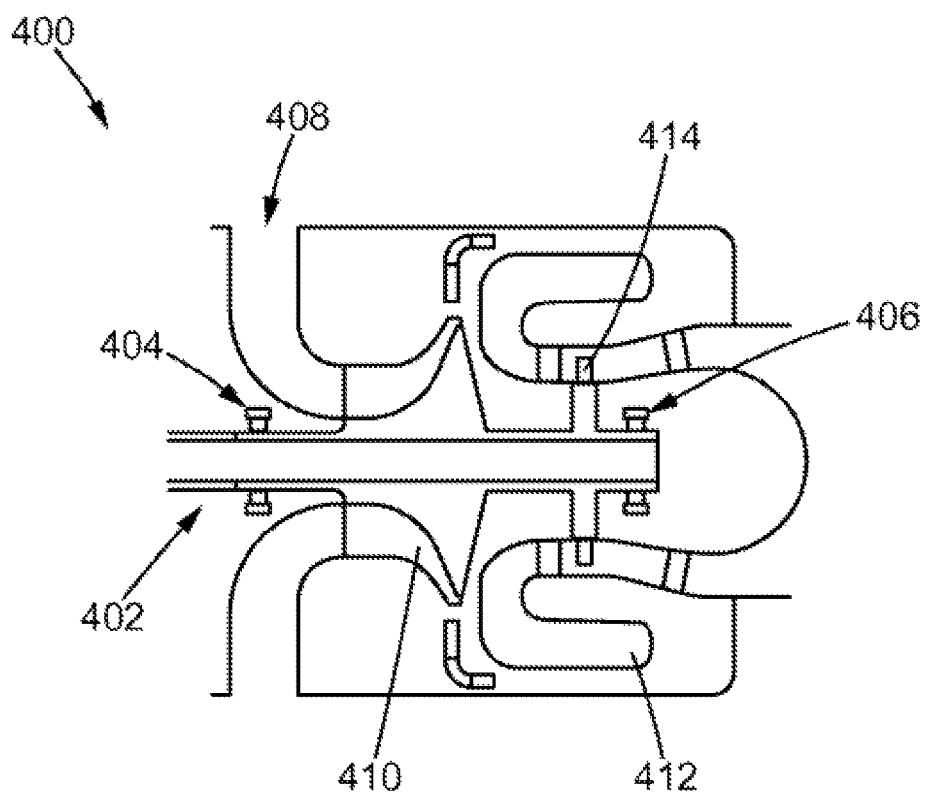

Lubrication device 110 can also equip a turbine shaft 402 of an auxiliary power unit (APU) 400, as shown in FIG. 9. Lubrication device 110 allows lubricating at least one bearing 404, 406 carrying turbine shaft 402. It is of particular interest for the lubrication of downstream bearing 406, because said bearing is surrounded by the exhaust gas pipe and is therefore difficult to access from outside turbine shaft 402. Bearing 406 is located in a relatively high-temperature area and requires effective lubrication for discharging heat. Inlet 114-1 of internal channel 114 for conveying the lubricant is located at a distance from this hot area. APU 400 is intended to produce electrical, pneumatic, or hydraulic energy to power an aircraft comprising it. Such an APU 400 is generally positioned at the rear of the aircraft, in the tail cone.

APU 400 comprises an air intake 408 serving a compressor 410. The compressed air leaving the compressor is directed towards a combustion chamber 412 which outputs hot gases. These gases drive turbine shaft 402 through turbine 414. Inlet 114-1 of internal channel 114 can be located for example axially upstream of air intake 408. Turbine shaft 402 can be connected to an electric generator, in which case inlet 114-1 can be located at an interface, for example such as a gear casing of a reduction gear, between turbine shaft 402 and the rotor of the electric generator. This makes it possible to reduce the length of lubricant delivery tube 112, thus preventing tube 112 from traversing the length of a rotor of the generator when it is aligned with turbine shaft 402.

The invention claimed is:

1. An assembly for a gas turbine comprising:
at least one bearing around an axis of rotation;
a hollow central shaft which is guided in rotation by the at least one bearing; and
a device for lubricating said at least one bearing, the device comprising:
a hollow lubricant delivery tube arranged in the hollow central shaft and configured to convey lubricant to said at least one bearing, said hollow lubricant delivery tube being arranged to be fixed in rotation relative to the axis of rotation, the hollow lubricant delivery tube having:
a first section with a first diameter; and
a second section with a second diameter that is greater than the first diameter, wherein the second section comprises:
a plurality of radial channels connecting a longitudinal channel inside of the lubricant delivery tube to a radially inner wall of the hollow central shaft so as to form a lubricant film between said second section of the hollow lubricant delivery tube and said radially inner wall of the hollow central shaft.

2. The assembly according to claim 1, wherein the radially inner wall of the hollow central shaft has a diameter, and wherein the second diameter is between 90% and 99% of the diameter of the radially inner wall of the hollow central shaft.

3. The assembly according to claim 1, wherein the second section comprises at least one thread of a threaded portion.

4. The assembly according to claim 3, wherein the hollow lubricant delivery tube comprises a single threaded portion, and wherein a longitudinal dimension of said threaded portion is less than a longitudinal dimension of the hollow central shaft.

5. The assembly according to claim 3, wherein the second section of the hollow lubricant delivery tube is formed by threads of two threaded portions separated along the axis of rotation by a non-threaded portion.

6. The assembly according to claim 3, wherein a radially outer surface of each thread of at least one threaded portion comprises a first cylindrical surface and a second surface that is inclined relative to the axis of rotation of the hollow central shaft, the second surface being inclined so as to converge towards the axis of rotation of the hollow central shaft.

7. The assembly according to claim 6, wherein at least one of the radial channels leads to an inclined second surface of the at least one threaded portion of the hollow lubricant delivery tube.

8. The assembly according to claim 3, wherein the second section of the lubricant delivery tube comprises a first thread and a second thread which are parallel.

9. The assembly according to claim 1, wherein the hollow central shaft comprises at least one lubricant distribution chamber for distributing lubricant towards the at least one bearing, the longitudinal channel leading into said at least one lubricant distribution chamber.

10. The assembly according to claim 9, wherein the hollow central shaft comprises at least one channel radially traversing the hollow shaft and with one end open to the distribution chamber and the other end open to an inner ring of the bearing.

11. The assembly according to claim 1, wherein the hollow central shaft comprises at least one particle removal chamber, having an inside diameter that is greater than the inside diameter of the radially inner wall of the hollow central shaft.

12. The assembly according to claim 1, wherein the hollow lubricant delivery tube is arranged inside the hollow central shaft in a cantilevered manner.

13. Gas turbine comprising an assembly according to claim 1.

* * * * *